(No Model.)
T. H. BROWN.
GANG BAND SAW.
No. 487,658. Patented Dec. 6, 1892.
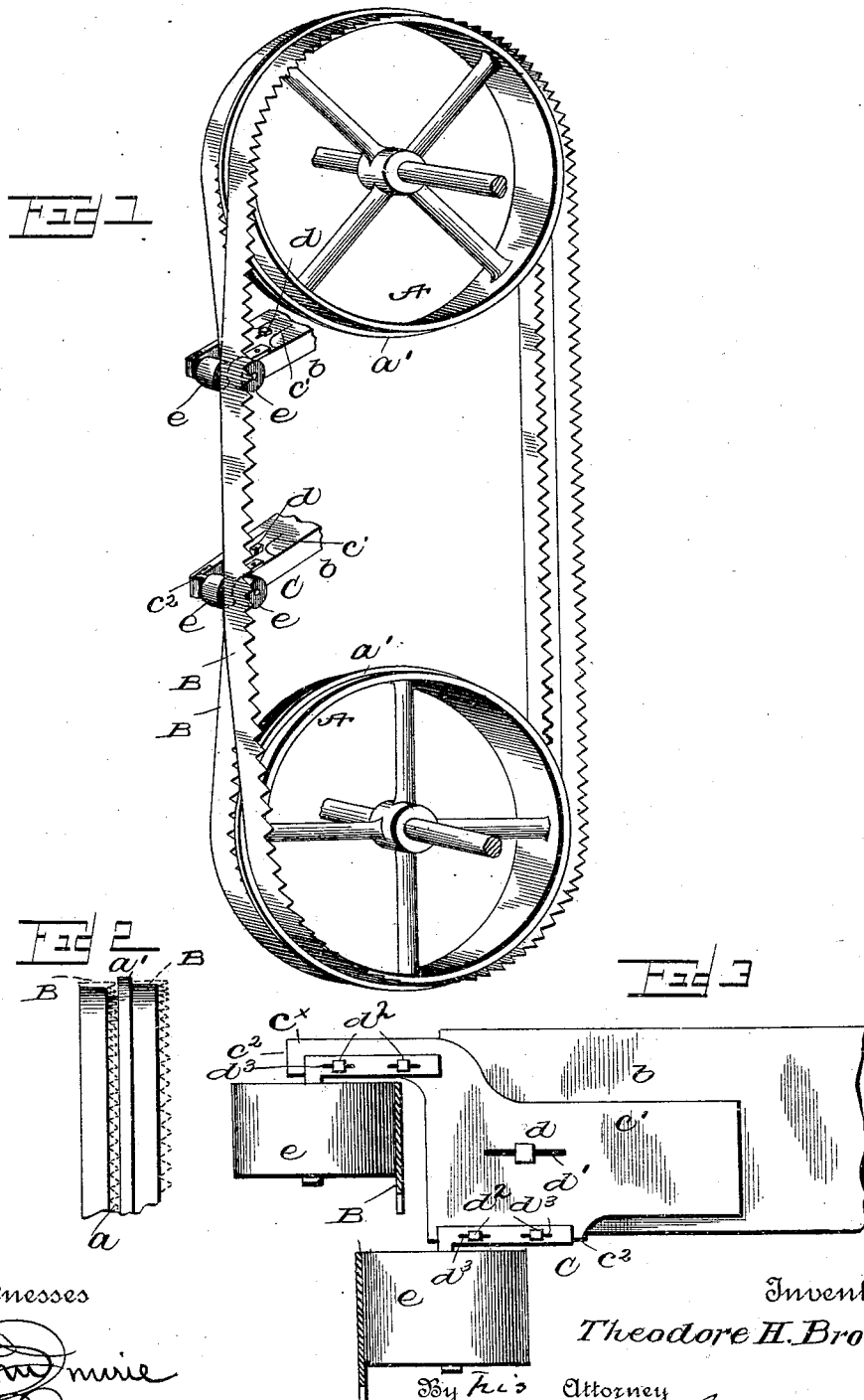
Witnesses
Inventor
Theodore H. Brown
By his Attorney

UNITED STATES PATENT OFFICE.

THEODORE H. BROWN, OF VIROQUA, WISCONSIN, ASSIGNOR OF ONE-HALF TO EMILUS S. GOODELL, OF SAME PLACE.

GANG BAND-SAW.

SPECIFICATION forming part of Letters Patent No. 487,658, dated December 6, 1892.

Application filed February 27, 1892. Serial No. 423,034. (No model.)

*To all whom it may concern:*

Be it known that I, THEODORE H. BROWN, a subject of the Queen of Great Britain, but now residing at Viroqua, in the county of Vernon and State of Wisconsin, have invented certain new and useful Improvements in Gang Band-Saws; and I do hereby declare the following to be a full, clear, and exact description of the invention, such as will enable others skilled in the art to which it appertains to make and use the same.

My invention relates to improvements in band-saws generally, and more especially gang band-saws, having for its object, among other things, to increase the working capacity or output of the saw, doubling the amount of material sawed in the same time as cut by a single saw in the old way, and to saw bevel boards, and with the same size of pulleys to saw different thicknessess of lumber; and it consists in the novel combination and arrangement of parts, substantially as hereinafter more fully disclosed, and pointed out in the claims.

In the accompanying drawings, Figure 1 is a perspective view of my improved gang band-saw. Fig. 2 is an edge view thereof. Fig. 3 is a plan view of the tension, &c.

In carrying out my invention I employ two suitably-spaced apart band-pulleys A A, mounted upon shafts and driven in the usual way. These pulleys are encompassed by two band or endless saws B of any approved construction, one saw having its teeth removed from contact with the peripheries of the pulleys by means of the grooves $a$ $a$ in said peripheries. The other saw has opposite its back edge circumferential edges or ridges $a'$ on the peripheries of said pulleys, limiting rearward lateral play of the saw to prevent its teeth normally projecting beyond the forward edges of the pulleys from contact with the peripheries of the pulleys.

C is the tension and spacing device for the saws, consisting of a suitably-secured bracket $b$, having adjustably connected thereto a plate or hanger $c'$ by set-screw bolt $d$, passing through said plate or hanger and a slot $d'$ in said bracket. The hanger or plate $c'$ has a tongue-like projection $c^x$ on its front edge, and on this tongue, as well as on the opposite side of the hanger on the body thereof, are adjustably secured the bent arms $c^2$ by means of adjusting-screws $d^2$, engaging slots $d^3$, formed in each of said arms. On each of the arms $c^2$ are mounted the small pulleys or rollers $e$, which engage the respective saws B, one of said saws passing over the inner face of one of the rollers $e$ and the other saw passing over the outer face of the other roller $e$. Thus it will be seen that the saws may be spaced apart to provide for simultaneously cutting two thicknesses of material at one operation. The rollers $e$ also exert a certain amount of tension upon the band-saws, and by adjusting the hanger or plate $c'$ through the set-screw bolt $d$ the tension may be varied or regulated as desired, and by shifting or adjusting the rollers themselves the saws may be spaced a greater or less distance apart, so that with the same size of pulleys boards of almost any desired thickness may be sawed, and also by varying the angle of the hanger $c'$ by means of set-screw and slot the saws may be made to cut on a bevel or at any desired angle.

I claim—

1. A pulley for band-saws, the face of which is provided with two driving-surfaces and a groove and a ridge intermediate said surfaces, said groove extending below the level of the driving-surfaces, substantially as set forth.

2. The combination, with the band-saws, of the pulleys, each having two driving-surfaces separated by a groove and a ridge, said driving-surfaces extending from the edges of the pulley up to the respective groove and ridge, said ridge separating said groove from one of the driving-surfaces, substantially as set forth.

3. In a band sawing-machine, the combination, with the pulleys, each of which has two separate driving-surfaces separated by a groove and a ridge, the groove extending below the level of the driving-surfaces, of a saw on each driving-surface, one in front of the other, and mechanism intermediate the pulleys for moving each of the saws in opposite directions an equal distance out of the direct line of travel between the peripheries of the pulleys, substantially as set forth.

4. In a band sawing-machine, the combination, with the pulleys which have separate driving-surfaces, of two saws thereon, one in front of the other, two brackets on the machine-frame, a slotted hanger on each of said brackets, adjusting-screws on each bracket, engaging the slots in the respective hangers, said hangers having each a tongue projecting from its forward end, slotted arms mounted on each of said tongues on the respective hangers, other slotted arms mounted on the opposite side of each hanger, adjusting-screws in said hangers, engaging the slots in the respective arms, and rollers on said arms bearing on and adapted to press the respective saws apart in opposite directions, substantially as set forth.

5. In a band sawing-machine, the combination, with the pulleys and the band-saws thereon, of two hangers adjustably secured between the pulleys and two spacing-rollers on each hanger, one of which bears against one side of one saw and the other of which bears against the other side of the other saw, whereby the saws may be pressed apart in opposite directions, each of said rollers being capable of independent adjustment on its respective hangers, substantially as set forth.

In testimony whereof I affix my signature in presence of two witnesses.

THEODORE H. BROWN.

Witnesses:
C. W. GRAVES,
ROBT. B. MCCOY.